United States Patent [19]
White

[11] Patent Number: 5,788,186
[45] Date of Patent: Aug. 4, 1998

[54] HELICOPTER LOAD SUSPENDING APPARATUS

[75] Inventor: Donald White, Russellville, Ark.

[73] Assignee: Sail D. White Ent. Inc., Russellville, Ark.

[21] Appl. No.: 795,255

[22] Filed: Feb. 10, 1997

[51] Int. Cl.$^6$ .................... B64O 1/08; B64C 1/22
[52] U.S. Cl. .................... 244/137.4; 244/118.1; 244/137.1 TD; 294/82.12
[58] Field of Search .................... 244/118.1, 137.4, 244/137.1, 138 R, 1 TD; 294/82.12

[56] References Cited

U.S. PATENT DOCUMENTS

| | | | |
|---|---|---|---|
| 2,953,330 | 9/1960 | Lysak | 244/118.1 |
| 4,431,363 | 2/1984 | Waite | 414/687 |
| 4,500,056 | 2/1985 | Della-Maretta | 244/1 TD |
| 4,514,135 | 4/1985 | Cade et al. | 414/682 |
| 4,626,012 | 12/1986 | Weldele | 294/81.3 |
| 4,759,674 | 7/1988 | Schroder et al. | 414/146 |
| 5,020,742 | 6/1991 | Haslim | 244/137.2 |
| 5,190,250 | 3/1993 | Delong et al. | 244/137.2 |
| 5,460,426 | 10/1995 | Tribelsky et al. | 297/17 |

*Primary Examiner*—Virna Lissi Mojica
*Attorney, Agent, or Firm*—Stephen D. Carver

[57] ABSTRACT

The apparatus stabilizes loads beneath helicopters to prevent undesirable load movement while allowing in-flight optimization of the load's center of gravity to reduce drag and increase banking capability and top speed. An anchoring bracket secures the apparatus to the helicopter. The apparatus comprises an upper section that controls load pitch and lateral movement and a lower section that controls load height during unloading. A pitch regulator comprises a c-shaped yoke with upper and lower collars penetrated by a hollow shaft and elevator. A lateral movement regulator comprises a coupling and a y-shaped chassis. The coupling comprises a central sleeve captivated between the upper and lower collars and a motor permitting selective rotation about the elevator. The chassis secures to the coupling via a ball and socket and a middle suspension system captivated between coupling and suspension plates. Spaced apart terminal chassis arms support the load via a bearing wing. A winch spools a cable with an load stop resting on a foot. The foot front is pivotally secured to the pitch regulator while the back is pivotally secured to the wing. The wing and the elevator control load pitch. As the elevator retracts or extends, the wing moves arcuately upwardly or downwardly to move the load center of gravity longitudinally forwardly or rearwardly to control load pitch. An optional lower section controls load height during unloading. A hoist band passing through a pulley system with actuators that variably space the pulleys variably controlling effective band length.

19 Claims, 10 Drawing Sheets

HELICOPTER LOAD SUSPENDING APPARATUS

BACKGROUND OF THE INVENTION

I. Field of the Invention

The present invention relates generally to load transporting helicopters. More specifically, the invention relates to a load suspending device for helicopters that controls the orientation and movement of the load during helicopter flight by manipulating the orientation and movement of the load to affect the speed, handling, maneuverability, operating parameters, and safety of the helicopter crew. Known prior art may be found in U.S. Classes 244 and 294 and the various subclasses thereunder.

II. Description of the Prior Art

Throughout the history of heavy lift, medium lift and utility helicopters, the question involving the location of the load attachment point has plagued engineers. If the attachment point is too low below the craft center of gravity, maneuverability must be sacrificed. On the other hand, if the attachment point is to high above the craft center of gravity, safety must be sacrificed, subjecting the craft to greater risks from undesirable craft oscillations and the like.

As will be recognized by those skilled in the art, helicopters are often conveniently employed to quickly and efficiently air-lift heavy loads short distances. Heavy lift helicopters were originally developed by the military to quickly transport important materials in combat situations. They continue to be used extensively by several segments of the military for these job duties.

Typically, these "heavy lift" helicopters and the like carry their loads on cables or "slings" extending beneath the fuselage of the aircraft. An obvious and significant advantage of helicopters over other conventional transportation vehicles is their mobility. For example, when combating forest fires, a helicopter can transport a large bucket or tank of water and then empty it directly onto the blaze. The helicopter can then quickly refill the external water tank by lowering it into a convenient lake or river and then quickly return to dump the new water on the blaze.

A problem associated with lifting helicopters involves load movements during flight. The cruising speeds of such helicopters are also severely restricted by the externally slung, often low density, high drag loads. Dangerous load oscillations often develop as a result of load inertia and/or movements during flight. Such oscillations may result in load jettisoning or disastrous loss of helicopter flight control.

Several prior art inventions have attempted to deal with the load movement/oscillation problems and are of general interest. For example, U.S. Pat. No. 5,460,426 deals with tilting an object at an angle without instability. U.S. Pat. No. 4,759,674 use a screw threaded device on a lever arm to lift nuclear irradiated fuel. U.S. Pat. No. 4,626,012 uses a device to tilt an object in more than one plane simultaneously. U.S. Pat. No. 4,514,135 uses a pivoting means combined with a geared articulated portion to rotate an article and then lower it after rotating it. U.S. Pat. No. 4,431,363 uses more than one parallel axis in one plane and a rotating cantilevered boom arm to lift an article while permitting steering and maintaining vehicle stability.

Somewhat more relevant is U.S. Pat. No. 3,838,836 that shows a load stabilizing device for heavy lift helicopters. This device uses three separate cables and winches to control the load orientation beneath the helicopter. Of course, a significant problem with this invention is the time required to hook up the load is correspondingly increased as well as the maintenance problems with three winches. At the other extreme, U.S. Pat. No. 4,138,078 shows a cargo hook that permits the load to freely move laterally.

However, the known prior art does not adequately address the need for an efficient and quick operating load suspension stabilizer for heavy lift helicopters. The prior art generally allow shifting of the centerline of rotor rotation but not intentionally mechanically shifting the moment arm of the center of gravity to affect in-flight dynamics. The prior art also fails to address the need for shifting the load attachment point during flight to manipulate undesirable parasitic drag. For example, it would be desirable to manipulate the affects of such drag for helicopters towing anti-submarine devices in the water, etc. Also, the prior art does not address the need for a load stabilizer that permits increased helicopter speeds during transport.

Helicopter pilots trained to use known prior art devices often deal with the load hazards by anticipating directional changes and varying helicopter speed and directions accordingly. No known devices permit an automatic response or a crew-initiated response to reduce the workload of the pilot. In a sense, the prior art fails to divide the stabilization problem into its two components, 1) the forces on the craft resulting from lifting the load, and 2) the forces acting on the entire helicopter, whether during stable flight, hovering or maneuvering, in order to provide a common solution to both.

Thus, a desirable load stabilizer would quickly eliminate load movements and/or oscillations during flight. The stabilizer should also permit increased helicopter speeds. An ideal load stabilizer would permit the pilot to anticipate load movements during helicopter momentum shifts, as when turning or stopping. Such anticipation would permit the pilot to correct reactionary load movements before they occurred to correspondingly increase the speeds at which the helicopter could safely turn and/or stop.

An ideal load stabilizer would relocate the load's center of gravity relative to the helicopter to quell undesirable load pitch changes and/or load lateral changes. A particularly desirous stabilizer would affect both the load and the helicopter's center of gravity to quickly squelch undesirable load movements and/or oscillations.

Another ideal load stabilizing feature would be an automatic hoist that moved the load upwardly or downwardly as necessary to compensate for an unstable unloading surface, such as a the deck of a bobbing ship at sea. Such an automatic hoist would move the load upwardly or downwardly in emergency situations and during training exercises. Thus, the load could be suspended a short distance below the helicopter during nap-of-the-earth (NOE) flight while permitting the pilot to quickly raise or lower the load if conditions warranted. For instance, if an oscillation problem developed, the pilot could pay out the hoist while climbing in order to gain reaction time to recover from the emergency. Of course, once the emergency situation was dealt with, the pilot could resume NOE flight or the like.

Another ideal load stabilization feature would permit a helicopter to drag a tow line in the water for anti-submarine warfare, oil spill clean-up or containment or the like while retaining its ability to maneuver fast while under the towing strain. The controls for the stabilizer would need to permit the attachment point to be variably and remotely manipulated to keep the helicopter in flight while initiating intended direction changes.

SUMMARY OF THE INVENTION

My helicopter load suspending apparatus overcomes the above perceived problems associated with the known prior art. The apparatus is intended to stabilize loads suspended beneath helicopters to prevent undesirable load movements and/or oscillations by allowing a means for an instrumentation interface and/or ideally controls (either automatic or manual) to assist in maintaining or affecting the dynamics to achieve results for the alignment of the center of gravity of the supporting structure (i.e., heavy lift, medium lift or utility helicopter or the like) with the center of gravity of the load.

Preferably, the stabilizer is used with supporting structures that are not fixed on the ground (i.e., heavy or medium lift or utility helicopters and the like). The stabilizer comprises an upper section pivotally secured to a base bracket. The base bracket secures the upper section to the supporting structure's framework. For example, the base is preferably anchored to the transmission supporting framework in a helicopter. At any rate, the base bracket must attach adjacent the supporting structure's center of gravity; but whether above or below is perceived to be not as critical to the design and safety provided the device and actuator linkages are rated for the forces and programmed or operated with the correct logic for the situation encountered (for this reason, the present disclosure does not include structure related to program logic or craft safety controls). The load supporting stabilizer is pivotally coupled to the structure via the bracket. An optional lower section can be attached to the upper stabilizer to control the vertical load height during unloading also.

The stabilizer comprises a pitch regulator that pivotally secures a lateral movement regulator. The pitch regulator comprises a c-shaped yoke and an elevator that extends through a pair of spaced apart collars defined in the yoke.

The c-shaped yoke comprises a front and a rear. (However, the device could be easily installed if rotated by ninety degrees also—such an installation might be favored for example in a BlackHawk helicopter to take advantage of the helicopter mounts already in place.) The rear is secured to the bracket by a sleeved axle to prevent transverse rotation of the yoke relative to the longitudinal axis of the helicopter. The c-shaped yoke further comprises a top and a spaced apart bottom. The fronts of both the top and bottom define spaced apart collars that receive a hollow axle that houses an elevator. The bottom collar also defines a bearing surface that supports the lateral movement regulator.

The elevator comprises an elongated, extensible shaft driven by an associated motor. The shaft top is pinned to the bracket via a pair of opposite studs each captivated by a bracket pinned strut. The shaft bottom is pinned to the bottom of the yoke. The elevator controls the longitudinal location of the load's center of gravity by extending and contracting the shaft. A winch attaches to the rear of the yoke adjacent the top. The winch spools a cable that secures the load to the helicopter via a cable stop and associated load bearing hardware.

The lateral movement regulator pivots about the hollow axle on the pitch regulator to control load lateral movement and to control the location of the load's center of gravity and/or the relationship of vertical lift components and the horizontal thrust components (i.e., momentum and centripetal forces) to eliminate oscillations or in a tightly tethered situation, the angle of attack and the nose-up or nose-down attitude.

A geared motor assembly actuates linkages to the stabilizer's spaced apart upper collar to permit selective rotation of the lateral movement regulator to control the transverse location of the load's center of gravity. The lateral movement regulator primarily comprises an upper coupling and a lower y-shaped chassis. Associated components include a spring suspension, a load thrust bearing surface, a number of load comparator slide wire transmitter sensors, pre-load hardware, a fulcrum ball and split socket.

The coupling comprises a stepped plate at one end with an elongated arm extending therefrom. The plate bottom rests upon the lower collar bearing. The plate defines a central sleeve through which the axle shaft and elevator pass.

The central sleeve is aligned between the column top and bottom collars to define a continuous sleeve about the hollow axle for the internal elevator. Thus, when the stabilizer is fully assembled, the actuator shaft penetrates the top collar, central sleeve and bottom collar respectively. The geared motor is mounted on the arm and linked to the top collar. As the motor operates, it rotates the arm, coupling and sleeve about the axle and elevator.

The coupling arm has a terminal fulcrum ball that supports one end of the chassis. The chassis middle is supported by a suspension system captivated between the coupling plate and an integral suspension plate on the chassis. The chassis is thus able to absorb minor up and down vertical movements of the load (i.e., to enable the pilot to smoothly ascend and descend). This chassis suspension movement allows better intermediate range sensing of the deflection of the springs and shock absorbers due to the immediate load oscillating characteristics for the pilot to feel or microprocessor to quantitatively compare the magnitude of the peaks and/or the differential comparisons on one side versus the elongation (decompression) of the other side. This decompression would indicate that the load is oscillating or experiencing a condition other than a coordinated turn (i.e., a momentum shift different from that of the helicopter). For situations such as training or standard operating procedures, a flight recorder/suspended load monitor could become more cognizant of the data and thereby, desirably more capable of initiating the correct response in a timely fashion. Likewise, a sensor in the position to sense spring deflection of fore and aft differences is contemplated to act with the sensor on the top collar to the base bracket to compare any data abnormalities to provide timely opportunity to recognize front to rear oscillations or momentum surges. The other spaced apart terminal ends of the chassis arms support the load via a pivoting load bearing wing.

The wing cooperates with the elevator length and pivot ration changes to control pitch and lateral movement. An adjustable load stop on the cable rests directly upon a pivoting foot that maintains a horizontal orientation. The foot front is pivotally secured to the pitch regulator, preferably by two interconnecting clevis pins or the like coupled to the column bottom. The foot back is pivotally secured to the wing by an elbow. Thus, the entire weight of the suspended load and cable rests on the foot via the cable stop and not on the winch spool. It is assumed that the cable between the spool and the stop remains slack. The foot also controls the position of the load cable when the lateral movement regulator shifts.

The wing offsets the foot from the chassis. Thus, as the elevator shaft retracts or extends, the foot and wing move arcuately upwardly or downwardly respectively. As the foot and wing move upwardly or downwardly, the load center of gravity moves longitudinally forwardly or rearwardly respectively because of the offset pivotal foot attachment.

As mentioned previously, the preferred embodiment of the stabilizer is meant for use with supporting structures, such as helicopters, where the supporting structure is not fixed on the ground. Thus, shifts in the load's center of gravity cause both the load and the supporting structure (i.e., the helicopter) to move relative to the new location of the load's center of gravity. This dual movement quickly reestablishes the alignment of the load's center of gravity with the helicopter's center of gravity. This realignment eliminates undesirable load movement and/or load oscillations.

An optional lower section can be used when unloading onto moving surfaces. The lower section uses a hoist assembly to control the vertical load height when the unloading surface is unstable, such as is often encountered when unloading onto the deck of a bobbing ship at sea. The hoist assembly permits quick height adjustments of the load relative to the helicopter. In other words, the load may be quickly moved upwardly or downwardly a short distance to compensate for the ships rolling motion on the ocean.

The hoist assembly comprises a band that is preferably attached adjacent the cable. The band loosely restricts the vertical load movement relative to the helicopter. During unloading, the band may be quickly released or retracted as necessary to maintain the load to ship spacing. A series of pulleys form a block and tackle to increase the travel distance and speed provided by the actuators. Several hydraulic actuators enable the band to be quickly raised and lowered as necessary. Preferably, the band may be release or retracted a few feet to permit small load height adjustments.

Thus, shifts in the load's center of gravity while hovering cause both the load and the supporting structure to move. Ideally, (as a human factors concern) the pilot could hold the helicopter with more margin of cyclic control, maintain steady state flight dynamics; and the crew could make minor shifts to minimize such minor adjustments to the helicopter and then the crew could return these to original position to already be at the predetermined steady state. In dynamic flight, this dual movement would be a deviation from the preferred practice known in prior art to execute a coordinated turn (that does not produce any sideward force pulling the helicopter inwardly or outwardly from the turn). Since the radius of the turn varies directly with the square of the velocity (true air speed) and inversely with the angle of bank, the craft could make imaginably sharper turns by momentarily shifting the moment arm toward the inside of the turn from the rotors' axis of rotation (within design limits not to exceed the G-forces of the craft). This coordinated realignment would reduce undesirable load moments and/or oscillations.

Thus, a primary object of the present invention is to provide a load attachment apparatus that selectively pivots to move the center of gravity of the transported load prior to and during momentum changes.

Another basic object of the present invention is to provide a load bearing apparatus that effectively moves the center of gravity of the helicopter when pivoting.

A more basic object of the present invention is to provide a load attachment device that reduce undesirable load oscillations.

A related object of the invention is to permit the pilot to relocate the center of gravity of the transporting vehicle prior to momentum changes by selectively relocating the center of gravity of the transported load.

A related object of a contemplated embodiment of the invention is to permit the relocation of load, ballast, fuel, ammunitions or the like to affect the top speed or velocity-not-to-exceed (VNE) of supporting helicopters by shifting weight to the side of the advancing rotor blades.

Another related object of the invention is to eliminate load oscillations when the transporting vehicle stops suddenly by adjusting the pitch of the transporting vehicle.

A basic object of the present invention is to improve the load handling characteristics of a helicopter transporting a suspended load.

Another basic object of the invention is to simplify unloading of airlifted loads upon ships at sea.

A related object is to provide a hoist assembly that quickly adjusts the vertical height of a load so that it may be quickly lowered or raised to match the bobbing movements of a ship at sea.

A more basic object of the present invention is to provide a load handling apparatus that increases the safety of airlifting loads with helicopters.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

With reference to the accompanying drawings, the helicopter load suspending apparatus is generally designated by reference numeral 20 in FIGS. 1–15. The apparatus 20 overcomes several of the perceived problems associated with the known prior art. The apparatus stabilizes a load 30 suspended beneath a helicopter 40 or the like to prevent undesirable load movements and/or oscillations. Apparatus 20 maintains the alignment of the center of gravity of the supporting helicopter 40 with the center of gravity of the load 30. The pilot or an automated microprocessor or the crew can control apparatus 20 via control box 26. Preferably, a central hydraulic pump and reservoir system 27 controls all motors and/or linkage actuators for maintenance convenience.

Figure 1:
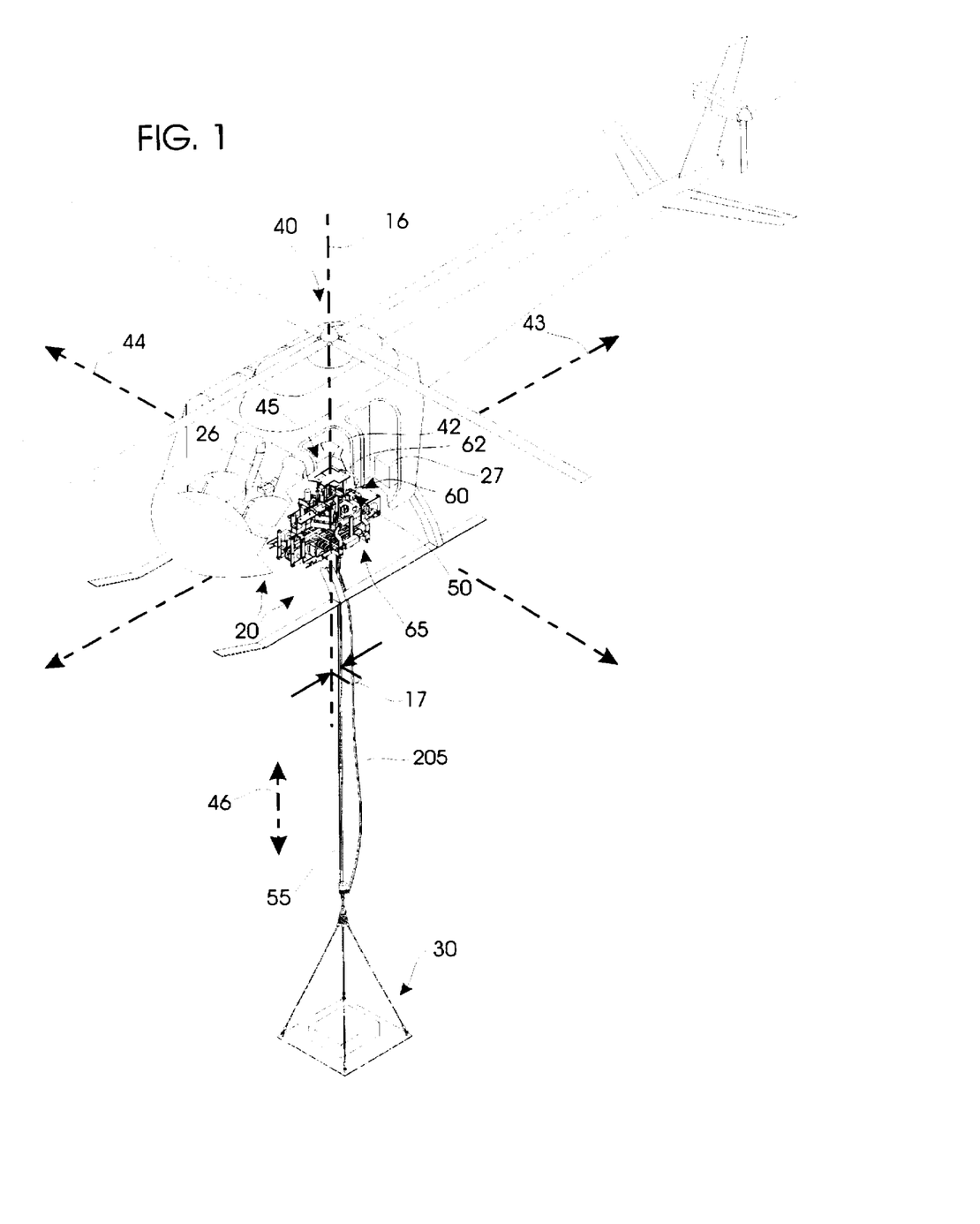
FIG. 1 is a partially fragmented environmental view showing a preferred embodiment of my invention securing a suspended load to a helicopter.
Figure 2:
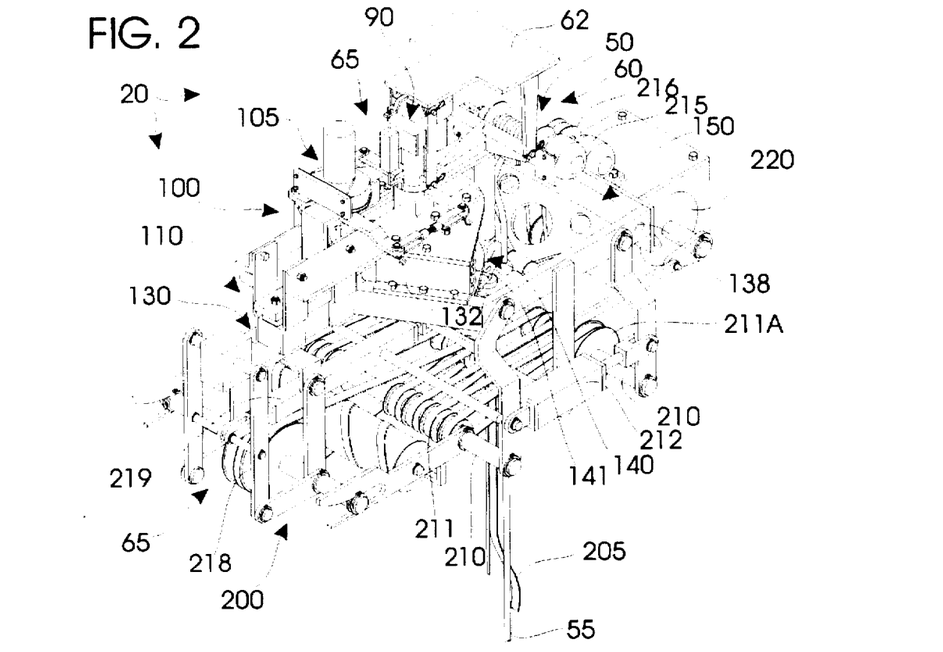
FIG. 2 is a greatly enlarged isometric view of the invention shown in FIG. 1.
Figure 3:
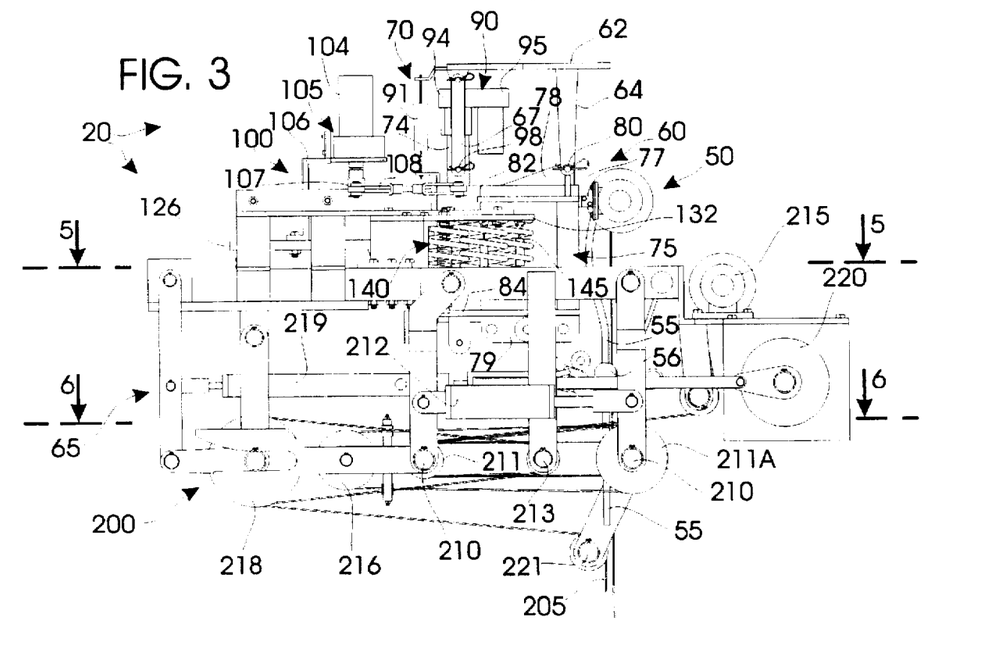
FIG. 3 is a side elevational view of the invention.
Figure 4:
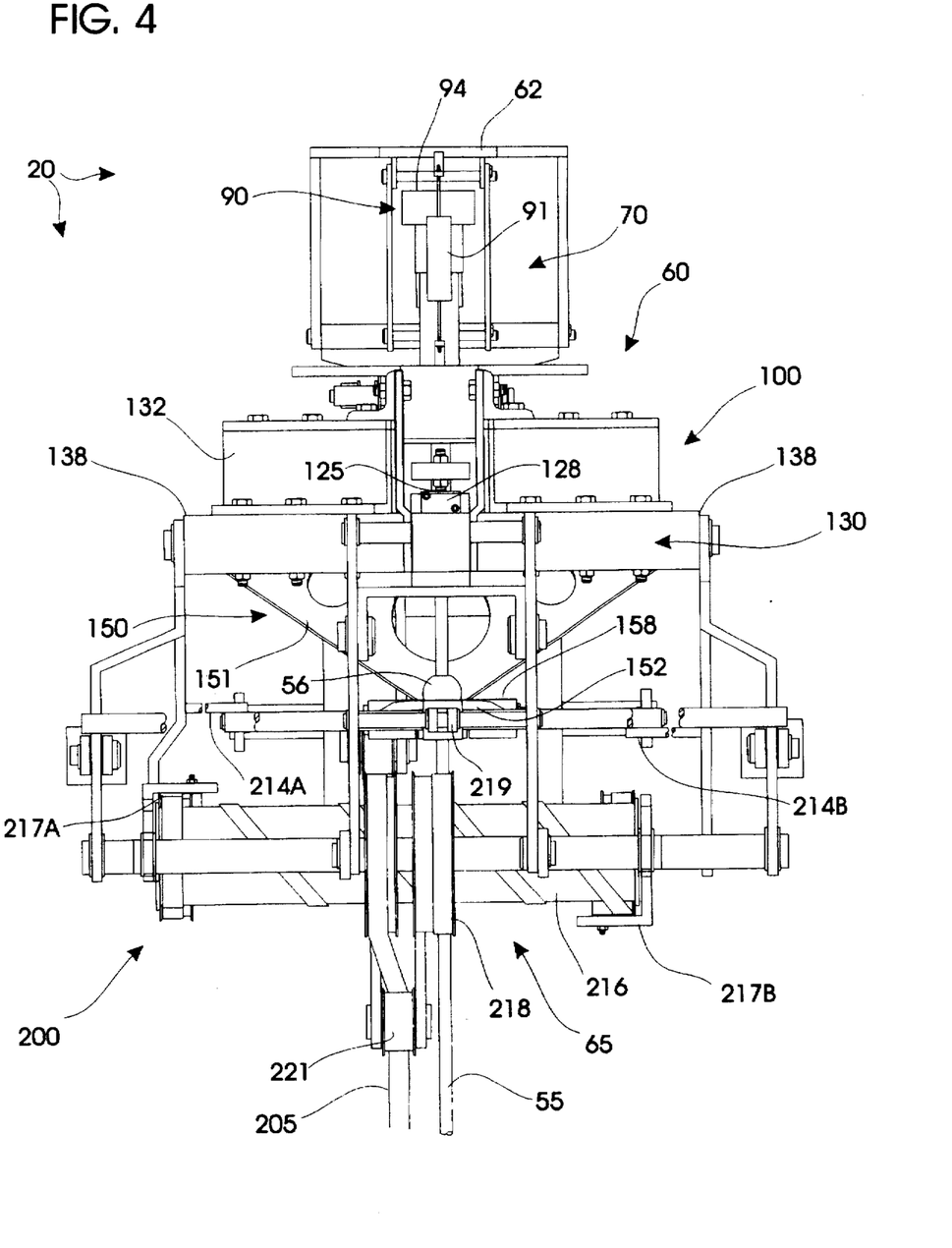
FIG. 4 is a partially fragmented, front elevational view of the invention, with portions broken away or omitted for clarity.

Preferably, the apparatus 20 is used with supporting structures that are generally stable (i.e., heavy lift helicopters or the like). The apparatus 20 comprises an upper section 60 pivotally secured to a base bracket 62. The base bracket 62 secures the upper section 60 to the supporting structure's framework 42. The bracket 62 thus pivotally couples the load supporting apparatus 20 to the structure 42. For example, the base is preferably anchored to the transmission supporting framework of helicopter 40. At any rate, the base bracket must attach adjacent the supporting structure's center of gravity 45. A winch 50 attached to the rear of the upper section 60 spools a cable 55 that secures the load 30 to helicopter 40. An optional lower section 65 can be attached to the upper section 60 to control the vertical load height during unloading also, as will be more fully discussed hereinafter.

The upper section 60 comprises a pitch regulator 70 that pivotally secures a lateral movement regulator 100. The pitch regulator 70 comprises a c-shaped yoke 75 and an elevator 90. The c-shaped yoke 75 comprises a front 76, rear 77, top 78 and a bottom 79. A sleeved axle 80 penetrates rear 78 to secure the yoke 75 to bracket arms 63, 64 (FIG. 8) to prevent transverse rotation of the yoke 75 relative to the longitudinal axis 42 of helicopter 40. The front of top 78 and bottom 79 define two spaced apart, concentric collars 82, 84 that cooperatively captivate the elevator 90.

Elevator 90 is housed in hollow axle 93. Elevator 90 comprises an elongated, extensible shaft 92 driven by an associated motor 95. The shaft top 94 is pinned to the bracket via a pair of oppositely protruding studs 96, 98 penetrating bracket links 66, 67. The shaft bottom 99 is pinned to the yoke bottom 79 via a pin or other conventional arrangement. The elevator 90 controls the longitudinal location of the load's center of gravity by extending and contracting the shaft 92. An appropriate measuring sensor 91 detects the shaft extension and reports the quantity of extension so that the pilot may control the elevator 90 remotely. The collars 82, 84 cooperatively captivate axle 93 and elevator shaft 92 while the bottom collar also defines a bearing surface 86 that supports the lateral movement regulator 100.

The lateral movement regulator 100 pivots about the pitch regulator 70 to control load lateral movement. A articulated motor assembly 105 permits selective rotation of the lateral movement regulator 100 along the helicopter's transverse axis 44 or generally thereabout in an arcuate path from one side to the other. In effect, the lateral movement regulator 100 controls the transverse location of the load's center of gravity in response to commands from the pilot, crew or automated controller, as will be more fully discussed hereinafter.

The motor assembly 102 comprises a motor 104 that rotates the lateral movement regulator 100 in response to commands from the pilot. The motor 104 is mounted on a bracket 106. The motor 104 selectively rotates an elongated bar 107. Bar 107 in tun rotates two adjustable turnbuckles 108, 109. The distal end of each turnbuckle 108, 109 is secured to a protruding top collar post 88, 89 respectively. Thus, the yoke 75, which cannot move transversely with respect to the longitudinal helicopter axis 42, provides the anchor for the transverse pivotal movement of the lateral movement regulator 100.

The lateral movement regulator 100 further comprises an upper coupling 110 and a lower y-shaped chassis 130. The coupling 110 comprises a stepped plate 112 at one end with an integral elongated arm 120 extending therefrom. The plate bottom 114 rests upon the lower collar bearing surface 86. The plate 112 defines a central sleeve 115 through which the axle 93 and elevator shaft 92 passes.

The central sleeve 115 is aligned between the yoke top and bottom collars 82, 84 to define a continuous sleeve for the elevator shaft 92. Thus, when the apparatus 20 is fully assembled, the elevator shaft 92 penetrates the top collar 82, central sleeve 115 and bottom collar 84 respectively. The integral arm 120 extends forwardly beneath the helicopter 40. Preferably, bracket 106 is secured adjacent the midpoint of arm 120. Thus, as the motor 105 runs, it rotates the arm 120, plate 112 and sleeve 115 about the elevator shaft 92. A fulcrum ball 125 is coupled to the arm terminus 126 via split socket 128.

The terminal fulcrum ball 126 supports the joined end 134 of chassis 130. The chassis middle 136 is supported by a suspension system 140 captivated between the stepped plate 112 and an integral chassis suspension plate 132. The suspension system 140 comprises a pair of oppositely captivated springs 141 surrounding a shock absorber 142 and a limiting bolt 143 (only one system 140 shown in FIG. 10). The limiting bolt 143 restricts the separating movement of the plates 112 and 132 while the shock absorber 142 dampens plate movements. Several radially spaced apart sensors 145 detect plate movements and report it so that the pilot may control the lateral movement regulator as necessary. The chassis 130 is thus able to absorb minor up and down vertical movements of the load (i.e., to enable the instrumentation to react to changes in distance). The other spaced apart terminal ends of the chassis arms 138 support the load 30 via a pivoting load bearing wing 150.

Figure 12:
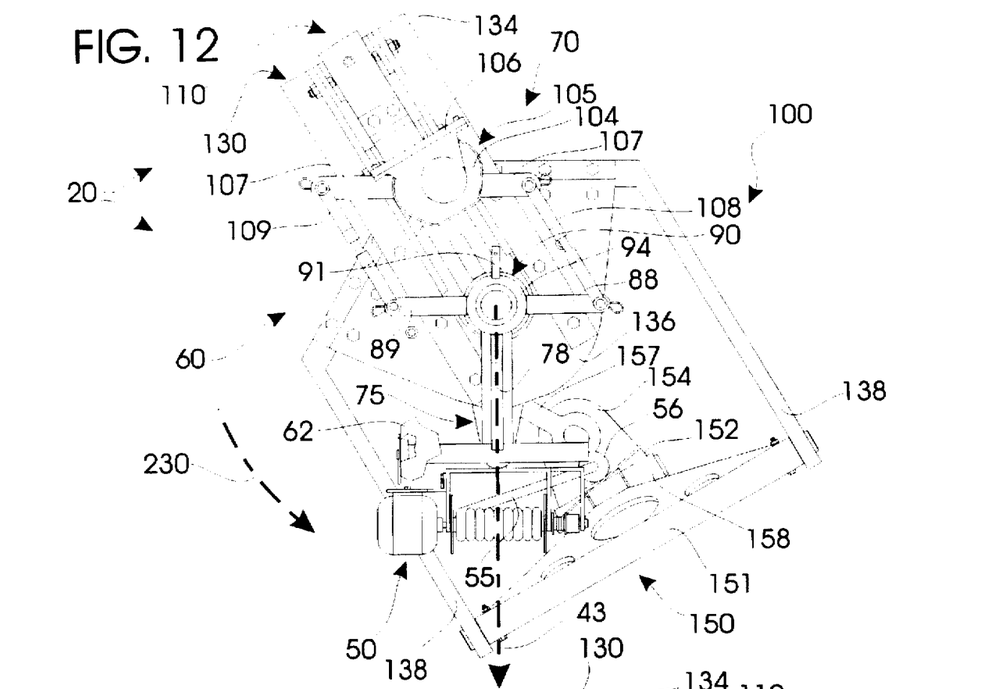
FIG. 12 is a top plan view similar to FIG. 9 but showing a moved position.
Figure 13:
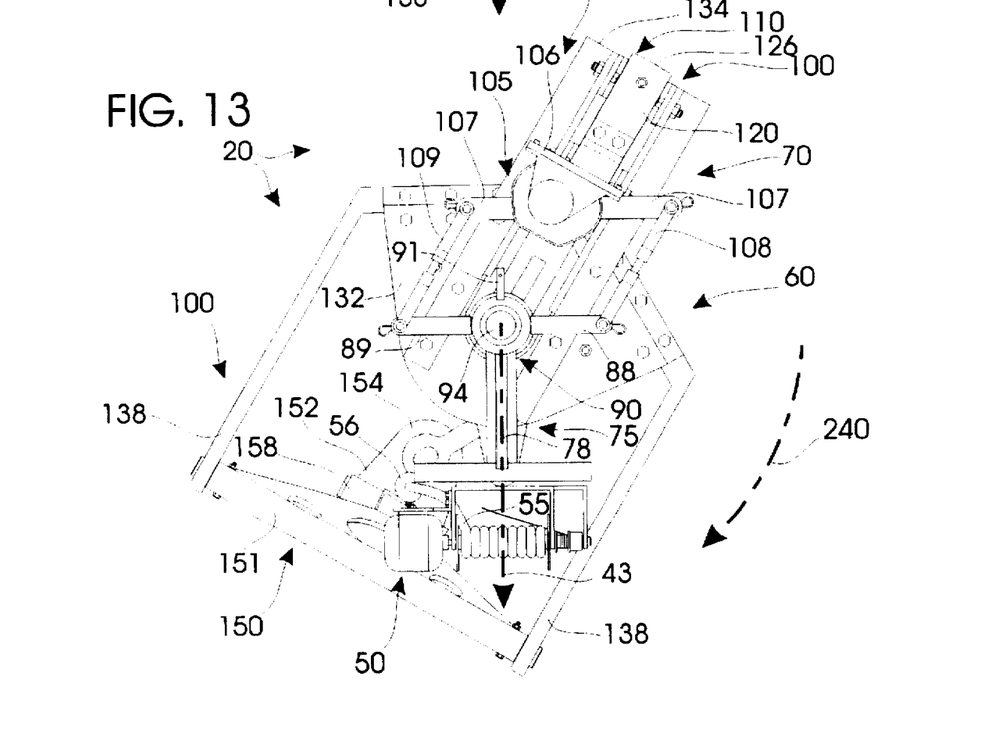
FIG. 13 is a top plan view similar to FIGS. 9 and 12 but showing another moved position.
Figure 14:
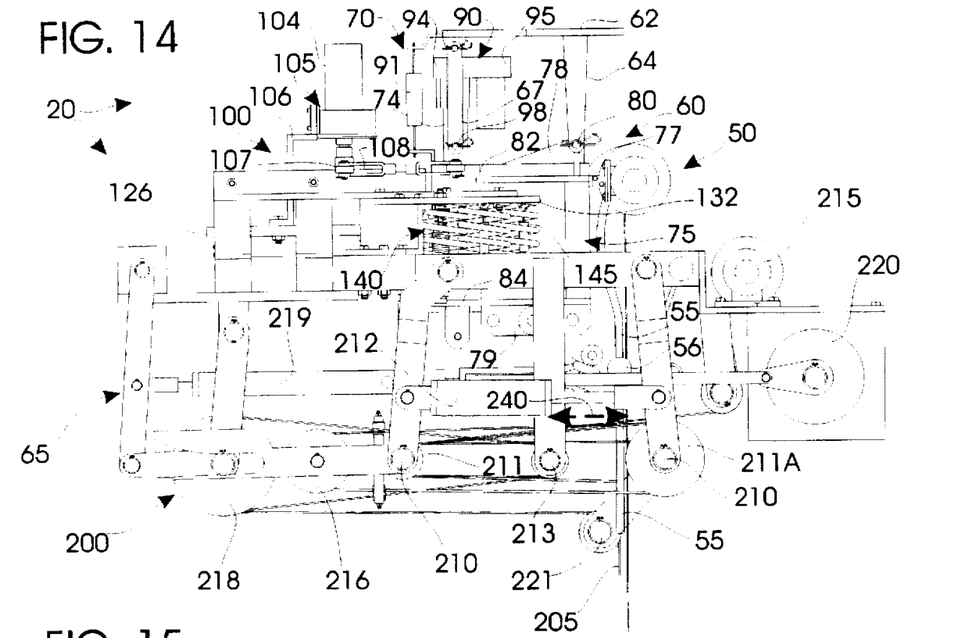
FIG. 14 is a side elevational view similar to FIG. 3 but showing a moved position; and, FIG. 15 is a side elevational view similar to FIGS. 3 and 14 but showing another moved position.
Figure 15:
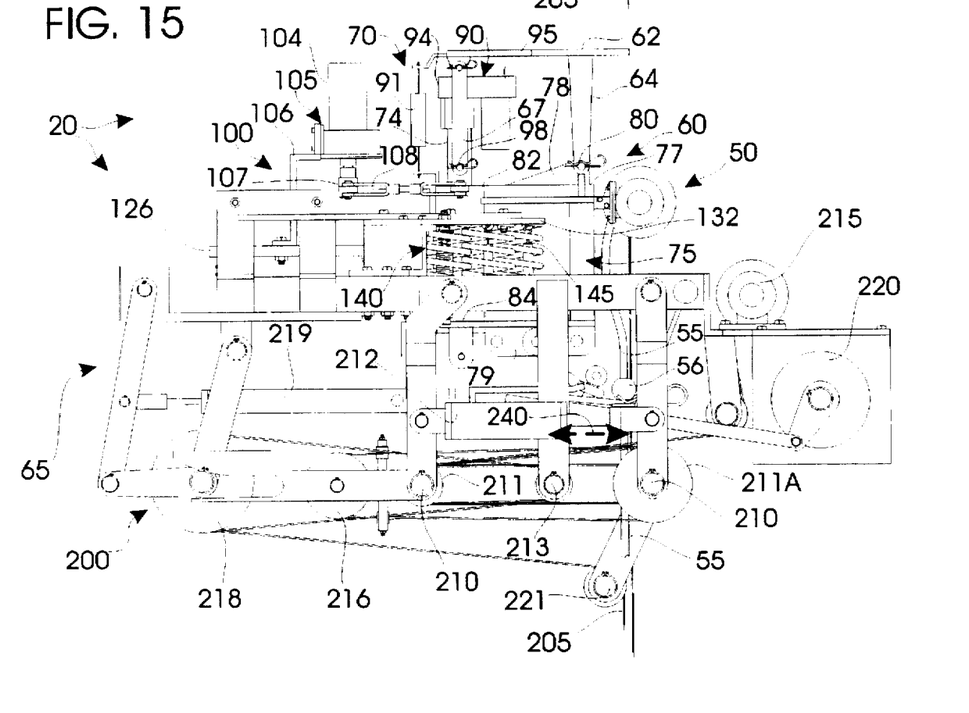

The wing 150 cooperates with the elevator 90 to control load pitch. A load stop 56 on the cable 55 rests directly upon a pivoting foot 152 supported by wing body 151. Foot 152 maintains a generally horizontal load orientation. The wing 150 and foot 152 also offset the load 30 from the longitudinal axis as the integral arm 120 and thus the chassis 130 are rotated as shown in FIGS. 12 and 13. The load stop uses a set screw 58 or another compound clamping means or the like to maintain its setting. The foot front 154 is pivotally secured to the pitch regulator, preferably several pins, shown as two interconnecting clevis pins 156, 157, coupled to the column bottom 79. The foot back is pivotally secured to the wing 150 by an elbow 158. The wing 150 offsets the foot 152 from the chassis 130. Thus, as the elevator shaft 92 retracts or extends, the foot 152 and wing 150 move arcuately upwardly or downwardly as generally represented by arrow 225. As the foot 152 and wing 150 move upwardly or downwardly, the load center of gravity moves longitudinally forwardly or rearwardly because of the offset pivotal foot attachment.

As mentioned previously, the preferred embodiment of the stabilizer is meant for use with supporting structures, such as helicopters 40, where the supporting structure is not fixed on the ground. Thus, shifts in the load's center of gravity cause both the load and the supporting structure (i.e., the helicopter) to move relative to the new location of the load's center of gravity. This dual movement quickly reestablishes the alignment of the load's center of gravity with the helicopter's center of gravity. This realignment eliminates undesirable load movement and/or load oscillations.

An optional lower section 65 can be used when transferring loads to unstable surfaces. The lower section 65 comprises a hoist assembly 200 that controls the vertical load height when the unloading surface is unstable, such as is often encountered when unloading onto the deck of a bobbing ship at sea. The hoist assembly 200 permits quick height adjustments of the load 30 relative to the helicopter 40. In other words, the load may be quickly moved upwardly or downwardly a short distance (as indicated by arrow 46 in FIG. 1) to compensate for the ships rolling motion on the ocean.

The hoist assembly 200 comprises a band 205 that is preferably attached to the load 30 adjacent the cable 55. The band 205 loosely restricts the vertical load movement relative to the helicopter during transit. During unloading, the band 205 may be quickly released or retracted as necessary to maintain the load to ship spacing.

Two spaced apart pulley axles 210 mount several wheels 211 about which band 205 is wound to form a block and tackle. The distance between pulley axles 210 may be increased by hydraulic actuator 212. A spacer 213 maintains band alignment between pulleys 210. The outer wheels 211A of rearmost pulley axle 210 are enlarged to feed band 205 onto winding pulley 216. A drive motor 215 rotates a reel 216A that plays out and takes Up band 205 as necessary. Band 205 then feeds onto redirectional pulley 218. Redirectional pulley 218 may also be moved inwardly or outwardly by linear actuator 219 and/or rotary actuator 220 (contemplated to be pneumatic or hydraulic or electrically powered) to fine tune the vertical load height.

Figure 5:
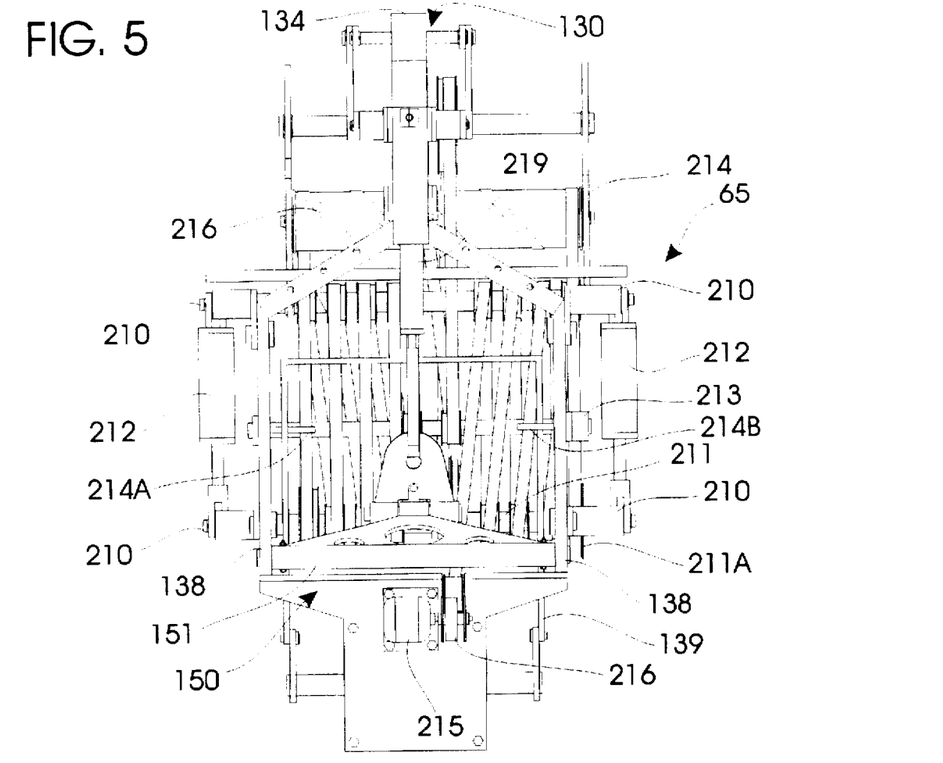
FIG. 5 is a cross-sectional view taken along line 5—5 of FIG. 3.
Figure 6:
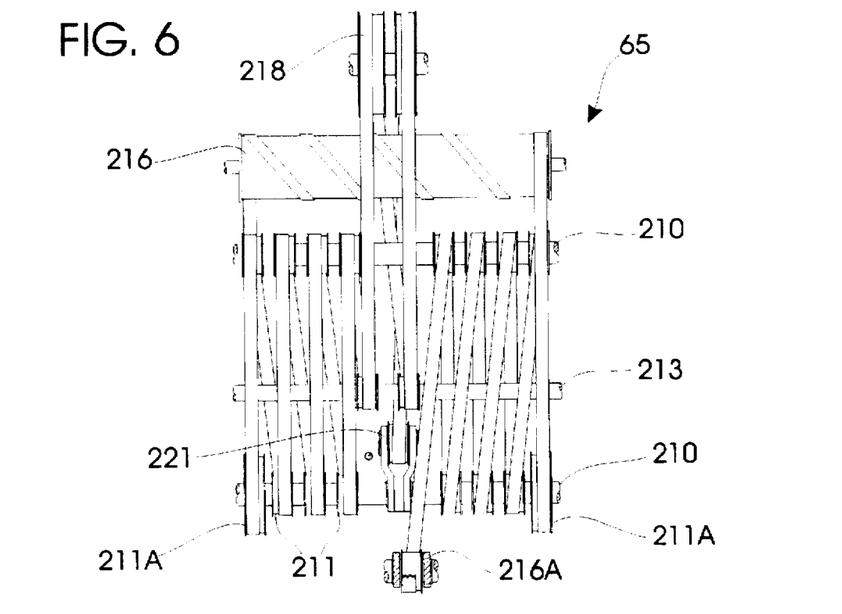
FIG. 6 is a partially fragmented cross-sectional view taken along line 6—6 of FIG. 3, with portions broken away or omitted for clarity.
Figure 7:
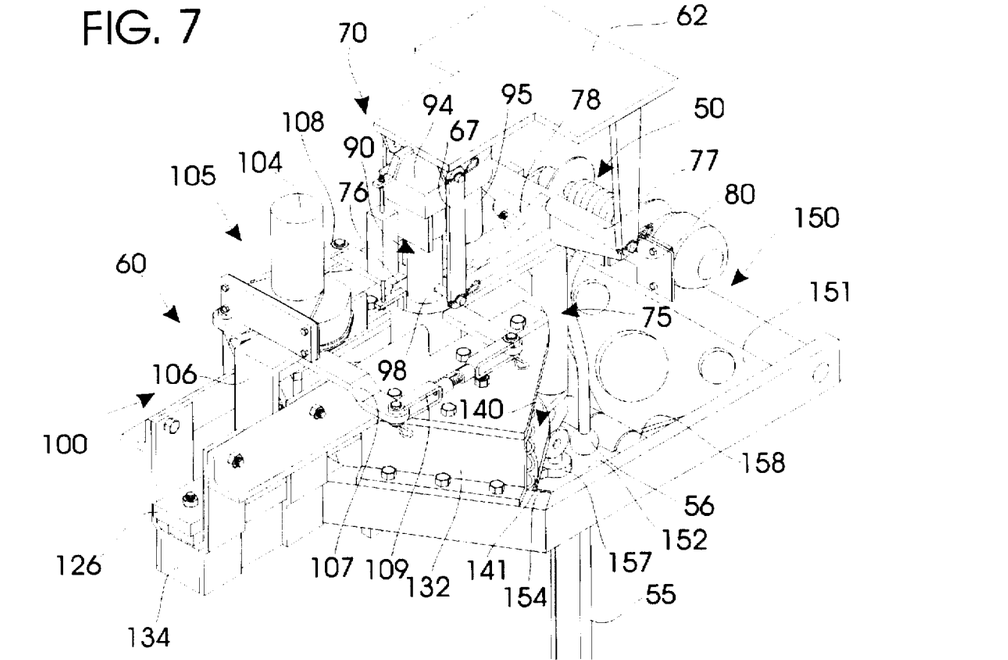
FIG. 7 is an isometric view of the upper section of the invention with the lower section omitted for clarity.
Figure 8:
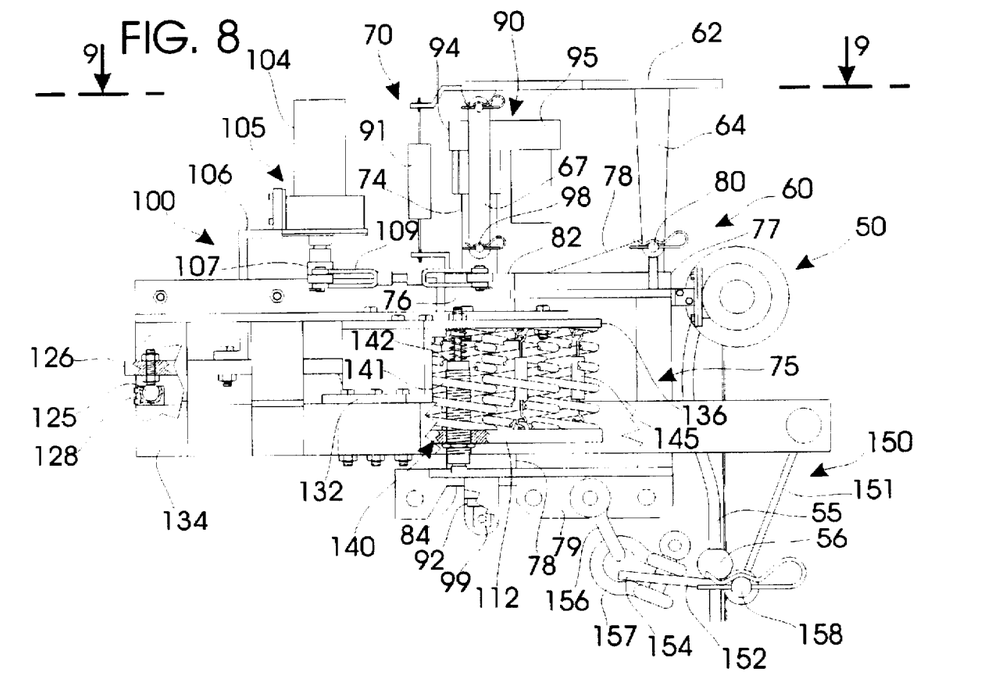
FIG. 8 is a partially fragmented side elevational view of the upper section of the invention, with portions broken away or omitted for clarity.
Figure 9:
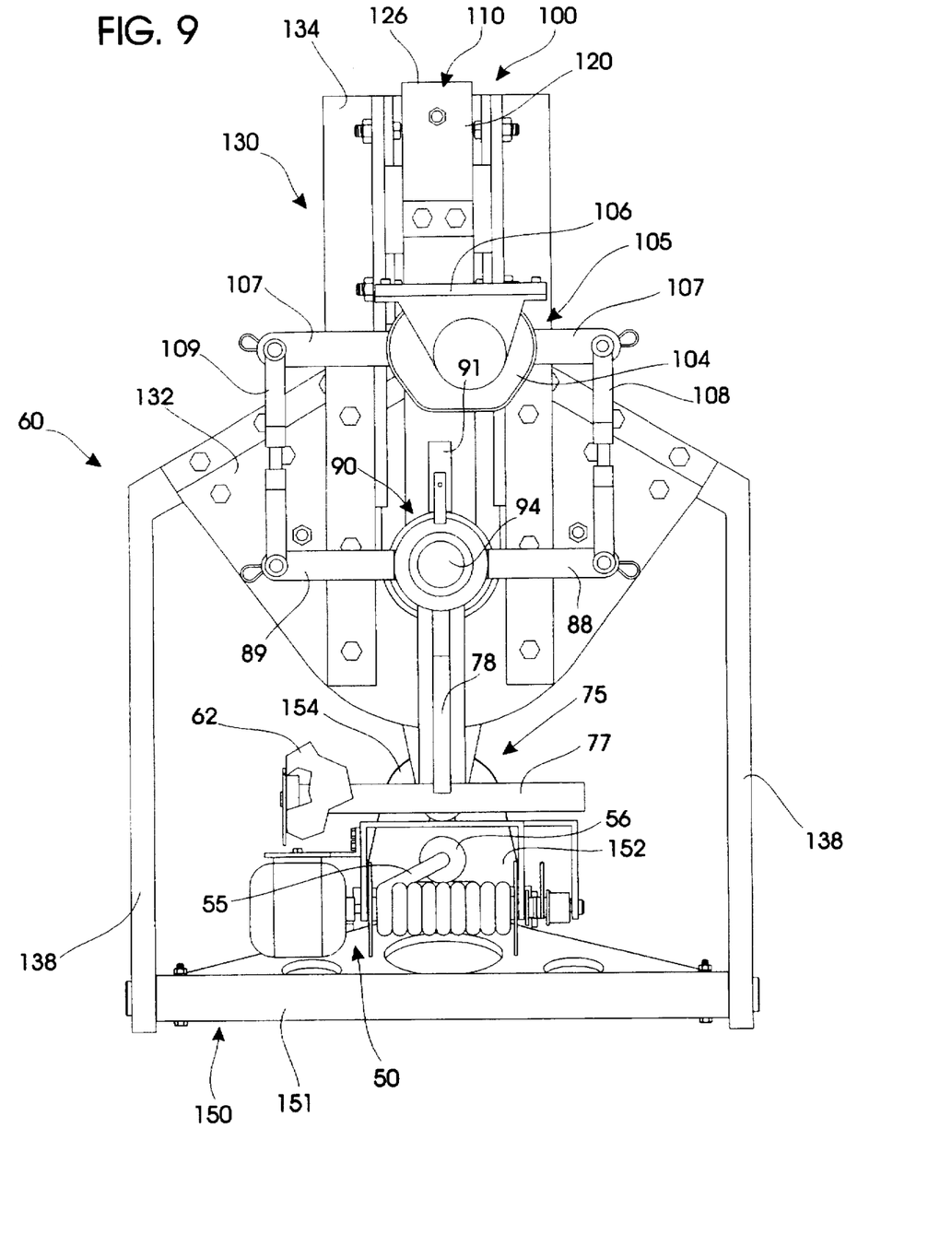
FIG. 9 is a cross-sectional view taken along line 9—9 of FIG. 8.
Figure 10:
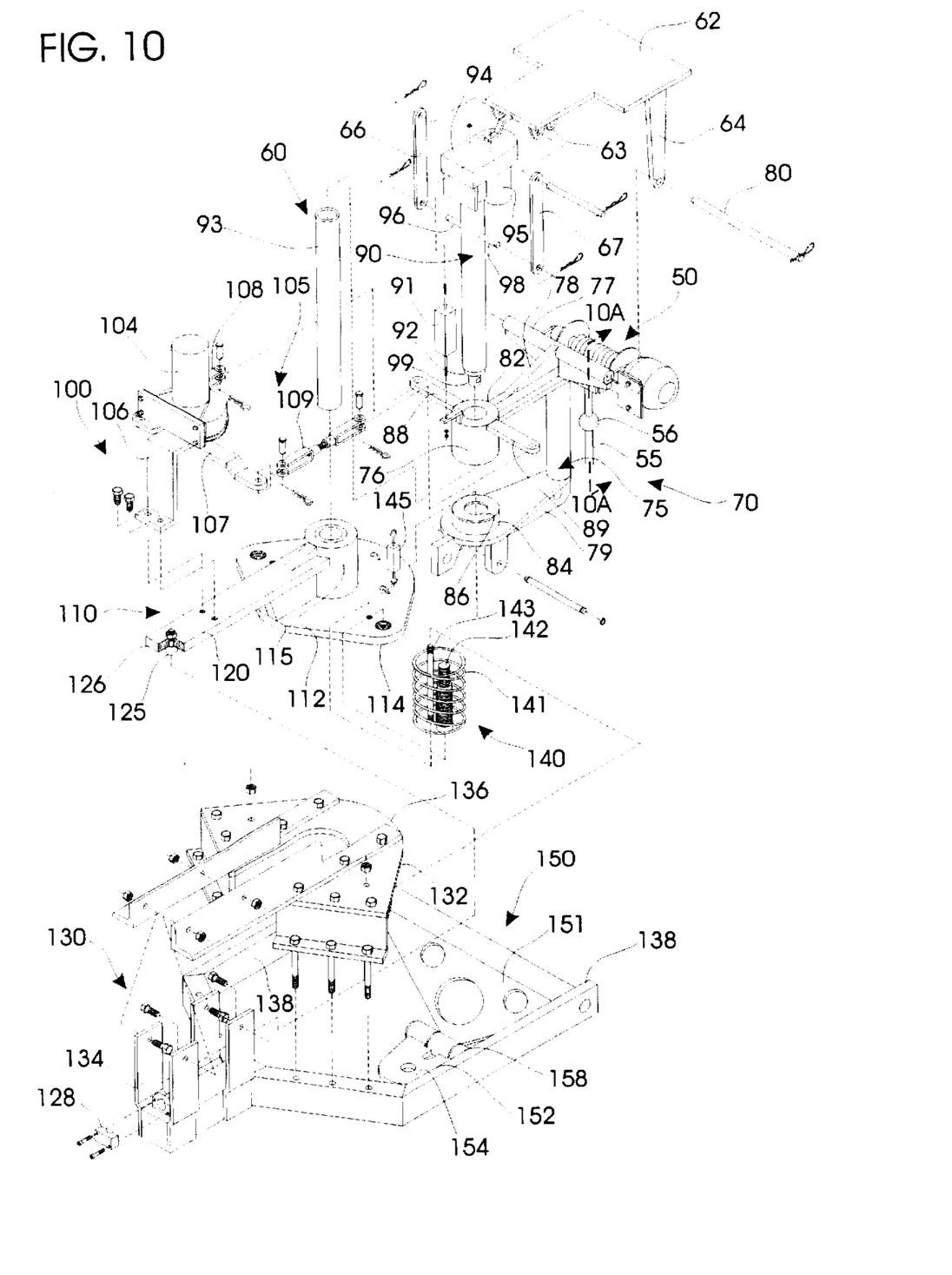
FIG. 10 is an exploded isometric view of the upper section of the invention.
Figure 10A:
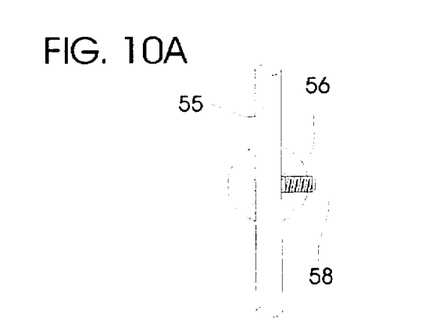
FIG. 10A is a cross-sectional view taken along line 10A—10A of FIG. 10.

The primary purpose of linear actuator 219 and rotary actuator 220 are to achieve the fine adjustment capability to have the amplitude peak more nearly as desired to conform to the anticipated irregular rise and fall of the ship's cargo surface. Rotary actuator 220 may be set to provide dampening related to the position of the lever arms 221 as a trigonometric function of linear distance and speed versus the angle of rotation. The rotary actuator 220 has a forked arm 139 (FIGS. 5, 13 and 14) which pivotally connects to the lever arms on the rear and slidably abuts the resistance end of the linear actuator so that the linear actuator may actuate individually; the rotary actuator may actuate individually or the rotary actuator and linear actuator and hydraulic actuators may actuate together or in a sequence in a fashion to complement the intent of desired results. The forked arm 139 is slidably captured above and below by fork rests 214A and 214B (FIG. 5).

The band progresses around pulleys to one side then traverses along a drum to the outside of the opposite side, then to work its way back to the middle. Idler fences 217A and 217B (FIGS. 2, 3 and 4), are respectively positioned to prevent the band from creeping from the ends of the usable drum space 216. A final drop pulley 221 redirects band 205 into a parallel alignment with cable 55.

Operation

In use, apparatus 20 stabilizes load 30 beneath helicopter 40. The upper section 60 controls the load pitch (forward and/or rearward movements) and lateral movement (side-to-side movements) during transit (FIG. 1). The optional lower section 65 may be used as necessary to quickly correct the vertical load height (represented by arrow 46) during unloading.

Figure 11:
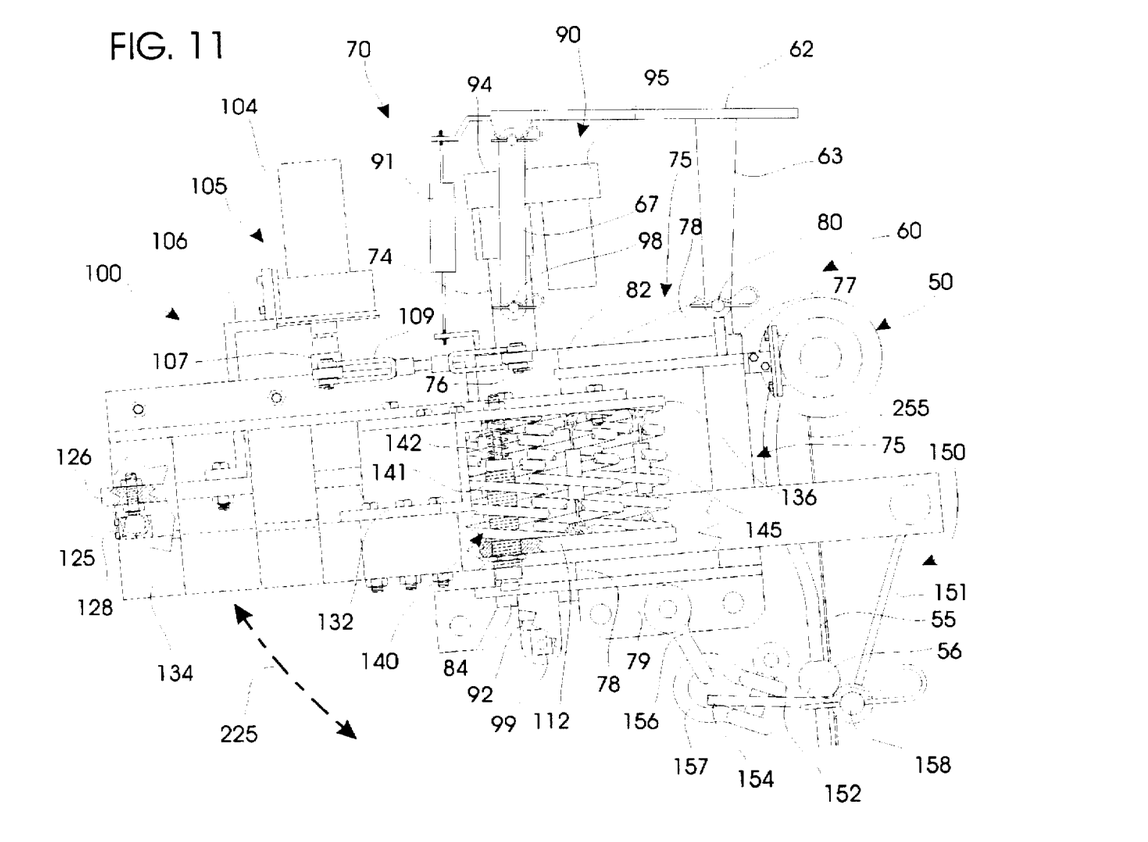
FIG. 11 is a partially fragmented side elevational view similar to FIG. 3 but showing a moved position, with portions broken away or omitted for clarity.

If the load 30 begins rocking forwardly and/or backwardly along the helicopter's longitudinal axis (indicated by broken arrow 43), there are a number of actions that could be performed to reduce these. One popular prior art method is to turn the craft. One discussed later is to simulate a turn by actuating the lateral movement regulator then returning the load to center, or the pilot or load master or other such person can activate the pitch regulator 70 to stop such movements (FIG. 11). In using the latter, the elevator 90 would have to be selectively elongated or retracted at the proper timings to reduce the undesirable motion. The elevator 90 elongates or retracts as necessary to stop the undesirable motion. As the elevator shaft 92 moves inwardly or outwardly, apparatus 20 pivots about axle 80 and links 67 (connected to bracket 62) to counteract the undesirable load movements by pivoting the load center of gravity (generally at load stop 56) as indicated by arrow 225. Preferably, this movement is directly opposite to the undesirable movement for part of the oscillation up-swing and then quickly positioned directly above the load's anticipated stopping point to cause its cessation.

If the load 30 begins rocking side-to-side (indicated by broken arrow 44), the operator can activate the lateral movement regulator 100 to reduce such undesirable movements (FIGS. 12-13) or alternatively actuate elevator 90 to initiate a 90 degree phase angle change to the oscillating load motion. Another method would be to lower the load quickly using the optional hoist lift. In the first, the motor 104 rotates arm 107 as necessary to counteract the undesirable movement. As arm 107 rotates and since turnbuckles 108 and 109 are secured to posts 88 and 89 and since posts 88 and 89 can not pivot sideways, turnbuckles 108 and 109 force the central sleeve 115 to pivot about shaft 92. As the lateral movement regulator 100 pivots about the helicopter's longitudinal axis 43, the load center of gravity (generally at load stop 56) is forced to move as load stop 56 moves. In other words, if load stop 56 moves in the direction indicated by arrow 230, the load center of gravity moves similarly (FIG. 12). On the other hand, if load stop 56 moves in the direction indicated by arrow 235, the load center of gravity moves similarly as well (FIG. 13). Thus, the operator may selectively and precisely pivot the lateral movement regulator 100 as necessary to counteract the undesirable load movements.

During unload, the lower section 65 may be used to quickly raise or lower the load 30 (as indicated by arrow 46 in FIG. 1) to correct for height variations on the unloading surface. The hoist assembly 200 manipulates band 205, which in turn quickly raises or lowers load 30 as necessary. The band 205 is played out and retracted by motor 215 about a series of pulleys 210, 214, 216 and 218. In effect, the hoist works like a horizontal block and tackle to control the vertical height of the load 30. As actuators 212 are elongated or retracted (indicated by arrow 240 in FIG. 14), the band 205 is quickly raised or lowered a substantial amount. Actuator 219 elongates or retracts (indicated by arrow 250 in FIG. 15) to fine tune the load height. Thus, the operator can quickly and accurately control the load height and conveniently correct it as necessary. An optional measuring tape 255 with sensor or a remote sensor deployed from a similar reeling means, or an infra-red range finder is contemplated to be used to give accurate height measurements.

Interestingly, the device used properly may contribute to faster suspended load transport with the advantages discussed above. Also, by having the ability to move the center of gravity of the helicopter while in flight, the shift could be made to the side of the advancing rotor blades so a better angle of attack could be reached and the retreating blades could be feathered to reduce stall and the velocity never to exceed (VNE) margin could be reconsidered while retaining adequate safety margins. Also, each time the centerline of the suspended load (or center of ballast) is moved laterally from the centerline of lift blade rotation 16, the result is a moment arm 16 that must be actively dealt with, but in some cases, it is very desirable to allow banking maneuvers of turns with shorter radii than those attempted in the prior art.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. Apparatus for controlling the pitch and lateral movement of a load held by a helicopter or aircraft, said apparatus comprising:

a pitch regulator adapted to be coupled to said structure, said regulator comprising a rigid yoke and an extensible elevator pivoted to the yoke;

a rigid chassis comprising a front, a rear, a pair of rearwardly extending, spaced apart arms, a cavity defined between said arms, and an elongated guide slot extending from said cavity towards said front;

a coupling pivoted to said pitch regulator for supporting the chassis, said coupling comprising an arm projecting towards the front of said chassis and captivated within said guide slot;

a flexible suspension resiliently connecting said chassis to said coupling;

a lateral movement regulator for twisting said coupling and thus said chassis relative to said yoke;

a displaceable wing pivotally suspended between said chassis arms, said wing comprising a load bearing foot that suspends the load; and, a junction between said foot and said pitch regulator enabling said elevator to pivot said wing.

2. The apparatus as defined in claim 1 further comprising hoist means for controlling the vertical height of said load.

3. The apparatus as defined in claim 2 wherein said hoist means comprises:

a band attached to said load for quickly raising or lowering said load;

at least two spaced apart pulleys about which said band is wound; and, means for varying the distance between said pulleys to lengthen or shorten said band to quickly raise or lower said load.

4. The apparatus as defined in claim 3 wherein said means for varying the distance between said pulleys comprises a hydraulic cylinder and a motor for actuating said cylinder.

5. The apparatus as defined in claim 1 wherein the means for varying the load is used to vary the moment arm relationship with the rotating lift blades to induce tight banking capability in turns.

6. The apparatus as defined in claim 1 wherein the lateral movement regulator is used to offset the load center of gravity toward the side of the advancing blades to essentially extend the cyclic control limits of the helicopter to optimize the center of air foil lift with the center of gravity of the entire helicopter including the load.

7. The apparatus as defined in claim 1 wherein the pitch regulator is used to offset the load center of gravity forwardly to enhance the speed capability of the helicopter.

8. An apparatus for controlling the pitch and lateral movement of a load suspended by a cable from a helicopter or aircraft, said apparatus comprising:

winch means for spooling said cable;

a stabilizer secured to said helicopter and adapted to support said winch means, said stabilizer comprising:

a pitch regulator depending from said helicopter and adapted to selectively transversely relocate the center of gravity of said load;

a lateral movement regulator pivotally secured to said pitch regulator, said lateral movement regulator adapted to support said load;

first sensor means for detecting undesirable load lateral movement;

first motor means responsive to said first sensor means for pivoting said lateral movement regulator about said pitch regulator to transversely relocate said load center of gravity to eliminate said undesirable load lateral movement;

means secured to said pitch regulator for relocating said load center of gravity longitudinally rearwardly or forwardly;

second sensor means for detecting undesirable load pitch; and, second motor means responsive to said second sensor means for activating said means secured to said pitch regulator to longitudinally relocate said load center of gravity to eliminate said undesirable load pitch.

9. The apparatus as defined in claim 8 wherein said pitch regulator further comprises a yoke depending downwardly from and pivotally secured to said helicopter, said yoke comprising a top and a spaced apart bottom collars and wherein said lateral movement regulator is rotatably coupled to said yoke top and supports said load by securing said cable.

10. The apparatus as defined in claim 9 further comprising wing means pivotally secured to said yoke and said chassis for securing said cable to support said load.

11. The apparatus as defined in claim 8 further comprising hoist means for controlling the vertical height of said load.

12. The apparatus as defined in claim 11 wherein said hoist means comprises:

a band attached to said load for quickly raising or lowering said load;

at least two spaced apart pulleys about which said band is wound; and, means for varying the distance between said pulleys to lengthen or shorten said band to quickly raise or lower said load.

13. The apparatus as defined in claim 12 wherein said means for varying the distance between said pulleys comprises a hydraulic cylinder and a motor for actuating said cylinder.

14. An apparatus for controlling the pitch and lateral movement of a load suspended by a cable from a helicopter or aircraft, said apparatus comprising:

winch means for spooling said cable;

a stabilizer secured to said helicopter and adapted to support said winch means, said stabilizer comprising:

a pitch regulator depending from said helicopter and adapted to selectively transversely relocate the center of gravity of said load;

a lateral movement regulator pivotally secured to said pitch regulator, said lateral movement regulator adapted to support said load;

first sensor means for detecting undesirable load lateral movement;

first motor means responsive to said first sensor means for pivoting said lateral movement regulator about said pitch regulator to transversely relocate said load center of gravity to eliminate said undesirable load lateral movement;

means secured to said pitch regulator for relocating said load center of gravity longitudinally rearwardly or forwardly;

second sensor means for detecting undesirable load pitch;

second motor means responsive to said second sensor means for activating said means secured to said pitch regulator to longitudinally relocate said load center of gravity to eliminate said undesirable load pitch; and, hoist means for controlling the vertical height of said load.

15. The apparatus as defined in claim 14 wherein said pitch regulator further comprises a yoke depending downwardly from and pivotally secured to said helicopter, said yoke comprising a top and a spaced apart bottom collars and wherein said lateral movement regulator is rotatably coupled to said yoke top and supports said load by securing said cable.

16. The apparatus as defined in claim 15 further comprising wing means pivotally secured to said yoke and said chassis for securing said cable to support said load.

17. The apparatus as defined in claim 16 wherein said hoist means comprises:

a band attached to said load for quickly raising or lowering said load;

a first set of at least two spaced apart pulleys about which said band is wound;

a second set of at least two spaced apart pulleys about which said band is wound after said first set;

first means for varying the distance between said first set of pulleys to lengthen or shorten said band to quickly raise or lower said load; and, second means for varying the distance between said second set of pulleys to fine tune the load height.

18. The apparatus as defined in claim 17 wherein said first and second means for varying the distance between said pulleys comprises a hydraulic cylinder and a motor for actuating said cylinder.

19. The apparatus as defined in claim 18 wherein said pitch regulator and said lateral movement regulator cooperatively selectively offset the center of induced parasitic drag by the load as in towing tag lines and as with use in anti-submarine warfare as the helicopter moves.

* * * * *